United States Patent [19]

Axthammer et al.

[11] Patent Number: 5,180,039
[45] Date of Patent: Jan. 19, 1993

[54] FLUID PASSAGE UNIT

[75] Inventors: Ludwig Axthammer, Hambach; Felix Wössner, Schweinfurt, both of Fed. Rep. of Germany

[73] Assignee: Fichtel & Sachs AG, Schweinfurt, Fed. Rep. of Germany

[21] Appl. No.: 908,830

[22] Filed: Jul. 2, 1992

Related U.S. Application Data

[63] Continuation of Ser. No. 545,918, Jun. 28, 1990, abandoned.

[30] Foreign Application Priority Data

Jul. 6, 1989 [DE] Fed. Rep. of Germany ....... 3922155

[51] Int. Cl.⁵ .............................................. F16F 9/46
[52] U.S. Cl. ................... 188/299; 188/315; 188/322.13
[58] Field of Search ............ 188/269, 299, 315, 318, 188/322.13, 322.15; 251/333

[56] References Cited

U.S. PATENT DOCUMENTS

| 3,180,453 | 4/1965 | Murata | 188/322.15 X |
|---|---|---|---|
| 3,429,552 | 2/1969 | Huley et al. | |
| 4,269,227 | 5/1981 | Araki et al. | 251/333 X |
| 4,650,042 | 3/1987 | Knecht et al. | |
| 4,802,561 | 2/1989 | Knecht et al. | 188/299 X |
| 4,850,460 | 7/1989 | Knecht et al. | 188/299 |
| 4,880,086 | 11/1989 | Knecht et al. | 188/299 |
| 4,960,188 | 10/1990 | Wössner | 188/299 |
| 4,993,524 | 2/1991 | Grundei et al. | 188/322.15 X |

FOREIGN PATENT DOCUMENTS

| 0162818 | 11/1985 | European Pat. Off. |  |
|---|---|---|---|
| 0234765 | 2/1987 | European Pat. Off. |  |
| 1262709 | 3/1968 | Fed. Rep. of Germany . | |
| 2051166 | 8/1971 | Fed. Rep. of Germany . | |
| 3348176 | 2/1988 | Fed. Rep. of Germany . | |
| 3609862 | 3/1988 | Fed. Rep. of Germany . | |
| 3800288 | 6/1989 | Fed. Rep. of Germany | 188/299 |
| 2249275 | 5/1975 | France . | |
| 2317573 | 4/1977 | France . | |
| 2613798 | 10/1988 | France . | |
| 2207222 | 1/1989 | United Kingdom . | |
| 2223822 | 6/1989 | United Kingdom | 188/315 |

Primary Examiner—Robert J. Oberleitner
Assistant Examiner—Lee W. Young
Attorney, Agent, or Firm—Brumbaugh, Graves, Donohue & Raymond

[57] ABSTRACT

In an electromagnetically operated valve, the armature of a solenoid is arranged in substantial alignment with a valve seat surrounding a channel. The valve seat has a substantially planar surface. A valve member also having a substantially planar surface is provided to sealingly engage the planar surface of the valve seat. The armature of the solenoid has a spherical end face engaging the annular valve member.

22 Claims, 5 Drawing Sheets

FLUID PASSAGE UNIT

This application is a continuation of application Ser. No. 07/545,918, filed on Jun. 28, 1990, now abandoned.

BACKGROUND OF THE INVENTION

This invention relates to an electromagnetically operated fluid passage unit. Such a fluid passage unit is used, for example, for hydraulic vibration dampers for varying the damping force. The fluid passage unit in such a vibration damper is provided as a bypass between two fluid chambers. In such hydraulic vibration dampers, it must be ensured particularly in view of low piston speeds that the fluid passage unit be absolutely tight.

STATEMENT OF THE PRIOR ART

In a known fluid passage unit for use as a bypass in a hydraulic vibration damper, the armature of a solenoid and the valve member form a structural unit. The sealing surface of the valve member and the guiding surface of the solenoid in which the armature is guided must be manufactured with extreme precision. More particularly, it is necessary that the axis of the armature and the axis of the magnetic core guiding the armature be exactly perpendicular to the surface of the valve seat. Moreover the bore in a housing accommodating the magnetic core of the solenoid must be precisely perpendicular to the surface of the valve seat. In order to satisfy the demand of absolute tightness of the valve component in closed condition, the manufacturing costs are very high.

OBJECT OF THE INVENTION

It is the object of the present invention to provide a magnetically operated fluid passage unit which is absolutely tight in its closed condition and nevertheless can be manufactured with reduced precision demands at reduced costs.

SUMMARY OF THE INVENTION

A fluid passage unit comprises means defining a fluid channel system and an electromagnetically operated valve system allocated to the fluid channel system for controlling fluid flow through the fluid channel system in at least one flow direction. The valve system comprises a valve seat surrounding a first fluid channel of the fluid channel system and a valve member group cooperating with the valve seat. The valve member group comprises an electromagnetically operated driver member and a valve member sealingly engageable with the valve seat. The valve member is in engagement with the driver member.

Preferably, the driver member comprises a spherically shaped angular face, and the valve member is in engagement with the spherically shaped annular face. The valve member may have a substantially planar sealing face engageable with a substantially planar counter-sealing face of the valve seat. The terms "sealing face" and "counter-sealing face" are used here irrespective of the shape of the valve seat. If the valve seat is formed of an annular edge, it is regarded also as a planar sealing face as long as this annular edge lies in a plane.

The valve member should be free for displacement with respect to the valve seat along the counter-sealing face of the valve seat.

The valve member may be an annular valve member which may have a substantially planar sealing face for engagement with a substantially planar counter-sealing face of the valve seat.

The annular valve member may have an annular engagement edge engaging the spherical support face. Alternatively, the annular valve member may have an annular spherical engagement face for engagement with the spherically shaped annular face.

The annular valve member may be sealingly engageable with the spherical support face.

The planar sealing face or the planar counter-sealing face may be shaped as a sealing edge of the valve member and the valve seat, respectively.

The annular valve member may be rigid or alternatively thin-walled and resilient.

The driver member may be biased by spring means towards a first terminal position and may be movable by an electromagnetic coil towards a second terminal position. Preferably, the driver member is biased towards a fluid flow-interrupting position by spring means and is movable by an electromagnetic coil towards a fluid flow-permitting position.

A most simple construction is obtained if the driver member is the armature of a solenoid.

In order to provide smooth operation with a minimum of spring forces and electromagnetic force, it is desirable that the driver member be subjected to fluid pressure within the fluid channel system such that the forces resulting from the fluid pressure are substantially balanced.

The armature may be guided within a hollow core member of the solenoid while this hollow core member is surrounded by an electromagnetic coil.

The fluid passage unit of this invention is particularly useful for vibration dampers of motor-vehicles. Such a vibration damper comprises a cylinder member and a piston rod member. At least two fluid chambers are defined within at least one of the cylinder member and the piston rod member. These fluid chambers may be connected to the fluid passage unit so that the fluid passage unit functions as a bypass which may be selectively opened or closed.

The fluid passage unit may comprise a housing rigidly fixed to the vibration damper.

Alternatively, the fluid passage unit may be connected to the fluid chamber of the vibration damper by external conduits.

The fluid passage unit of this invention may be used with double-tube vibration dampers, mono-tube vibration dampers and hydro-pneumatic suspension systems.

The various features of the invention are discussed especially in the accompanying claims which form part of the disclosure. For a better understanding of the present invention, its working advantages and specific effects, reference is made to the accompanying drawings and the description of the figures discussing a preferred embodiment of the invention.

BRIEF DESCRIPTION OF THE DRAWINGS

FIG. 1 shows a double-tube vibration damper 1 comprising a cylinder tube 4 and a container tube 11. A cavity 6 is provided within the cylinder tube 4. This cavity 6 is subdivided by a piston unit 5 into two working chambers 6a, 6b. The piston unit 5 is fastened to a piston rod 5a which is sealingly guided through a sealing and guiding unit 4a at the upper end of the cylinder tube 4. An annular compensating space 12 is provided between the cylinder tube 4 and the container tube 11. The working chambers 6a, 6b are filled with a damping liquid. The compensating space 12 is partially filled with the damping liquid and partially with a gas, more particularly with air.

Figure 1:
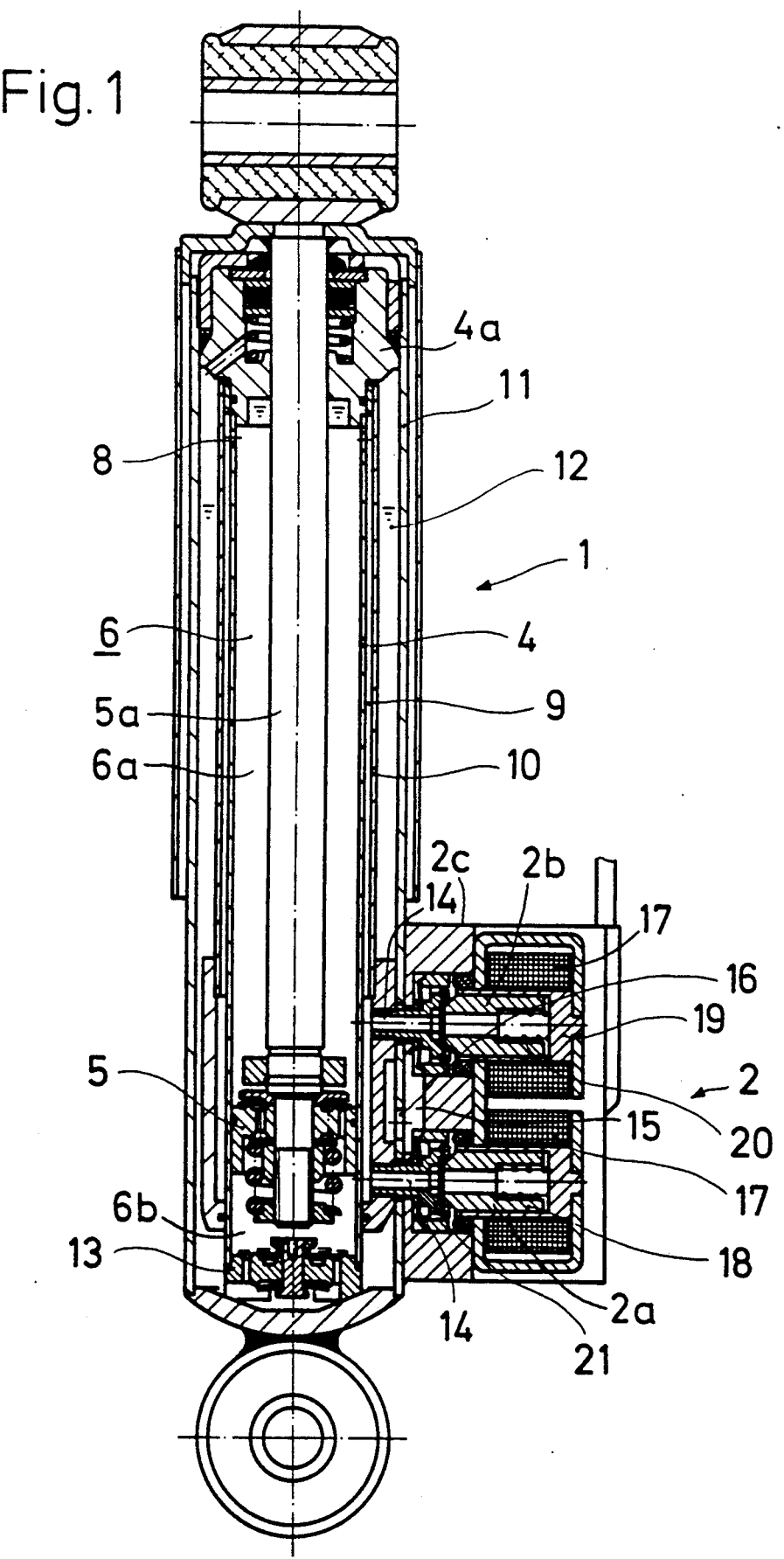
FIG. 1 shows a longitudinal section through a double-tube vibration damper of which the damping force can be varied by an electromagnetically operated bypass unit.

The piston unit 5 is provided with a piston valve system which allows liquid flow across the piston unit 5 in response to axial movement of the piston unit 5 in both inward and outward direction. At the lower end of the cylinder tube 4 is provided a bottom valve unit 13 permitting flow of damping liquid between the lower working chamber 6b and the compensating space 12.

The valve characteristics of the piston valves and the bottom valves can vary widely in accordance with the demands of the vehicle manufacturers. A typical example is as follows:

On outward movement of the piston rod 5a, a high flow resistance exists in the piston 5 for the damping liquid flowing from the working chamber 6a to the working chamber 6b. As the volume of the piston rod 5a within the cavity 6 is reduced, liquid will flow from the compensating space 12 into the lower working chamber 6b. The bottom valve 13 exerts only small resistance, if any, on the flow of damping liquid from the compensating space 12 to the working chamber 6b.

If the piston rod 5a moves inwards of the cylinder tube 4, the volume of the piston rod 5a within the cavity 6 is increased Therefore, damping liquid must escape from the working chamber 6b towards the compensating space 12. The bottom valve unit 13 exerts high resistance on this flow of liquid. Simultaneously, a flow of damping liquid occurs from the lower working chamber 6b to the upper working chamber 6a. The valve system in the piston unit 5 exerts resistance on this flow of liquid so that the pressure within the working chamber 6a becomes smaller than the pressure within the working chamber 6b. It is to be noted, however, that under normal circumstances the pressure within the upper working chamber 6a still is considerably higher than the pressure within the compensating space 12.

The preceding operation of the vibration damper corresponds to a type of vibration damper the characteristics of which cannot be modified during operation.

The vibration damper of FIG. 1, however, allows such modification of the damping characteristics, due to the provision of a bypass unit which is designated 2. The bypass unit 2 comprises two valve systems 2a and 2b. An intermediate tube 10 surrounds the cylinder tube 4; an annular space 9 is defined between the cylinder tube 4 and the intermediate tube 10. A fluid path extends from the upper working chamber 6a through a bore 8, the annular space 9, and the bypass unit 2 to the compensating space 12. This fluid path can be closed if both valve systems 2a and 2b are closed. In this case the vibration damper acts as described above. If the damping force is to be reduced more or less, the bypass unit 2 will be activated. The valve systems 2a and 2b are arranged in parallel within the fluid path extending from the upper working chamber 6a through the bore 8, the annular space 9, and the bypass unit 2 to the compensating space 12. The parallel flow branches through the valve systems 2a, 2b have different flow resistances. Thus the characteristics of the vibration damper can be varied by opening either the valve system 2a or the valve system 2b or both of them. Consequently, the vibration damper of FIG. 1 has four different damping characteristics (including the damping characteristic provided by closing both valve systems 2a and 2b).

If one of the valve systems 2a and 2b or both are opened, the operation of the vibration damper will be as follows:

On outward movement of the piston rod 5a, there is again a flow of damping liquid from the upper working chamber 6a to the lower working chamber 6b across the piston unit 5. In addition, however, there is also a flow of damping liquid from the upper working chamber 6a through the bore 8, the annular space 9, and the bypass unit 2 to the compensating space 12. As a result, there is an increased flow of damping liquid from the compensating space 12 through the bottom valve unit 13 into the lower working chamber 6b. The damping force thus is reduced as compared with the status before opening one of the valve systems 2a, 2b.

On inward movement of the piston rod 5a, again there is a flow of damping liquid from the lower working chamber 6b across the piston unit 5 to the upper working chamber 6a and a flow of damping liquid from the lower working chamber 6b to the compensating space 12.

However, as the pressure within the upper working chamber 6a is higher than the pressure within the compensating space 12, there is additional flow of damping liquid from the upper working chamber 6a through the bore 8, the annular space 9, and the bypass unit 2 to the compensating space 12. As a result, the damping force is reduced also on inward movement of the piston rod 5a.

The bypass unit 2 comprises a housing 2c which is fastened to the container tube 11, for example by welding. In the housing 2c, a fluid channel system is provided. This fluid channel system comprises channels 14 extending from the annular space 9 to the respective valve systems 2a, 2b, and a channel 15 extending from the valve systems 2a, 2b through a bore 16 to the compensating space 12. Each of the valve systems 2a, 2b comprises an electromagnetic coil 17.

Figure 2:
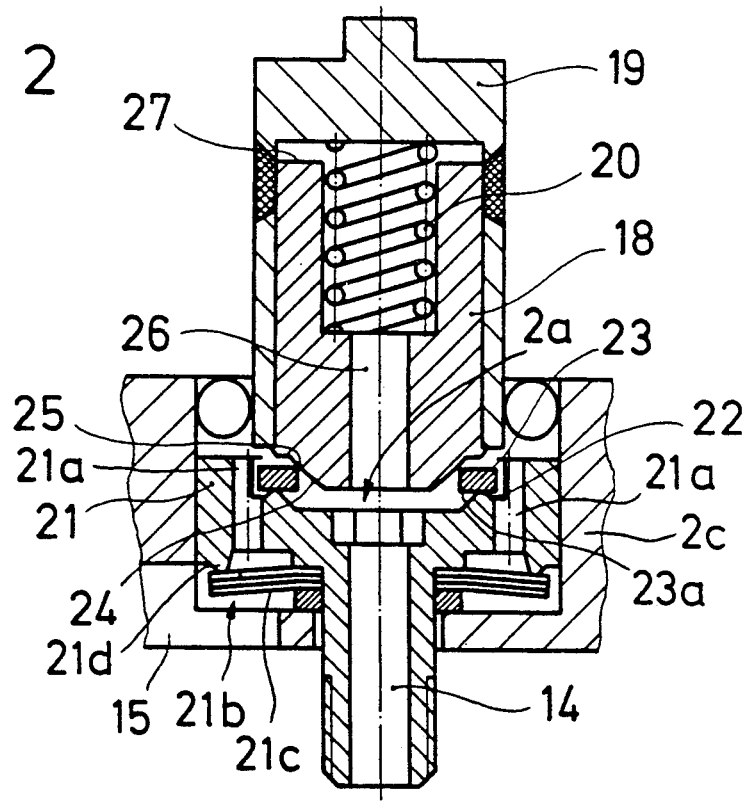
FIG. 2 shows, a valve system of the bypass unit of FIG. 1.

In FIG. 2 the valve system 2a is illustrated in detail by omitting the respective coil 17.

The valve system 2a comprises a seat member 21 with a valve seat 22 and the channel 14 provided in the center of the valve seat 22. The seat member 21 is accommodated within the housing 2c. An annular valve member 23 of substantially rectangular cross-section engages at the lower face 23a thereof the valve seat 22. An edge 25 of the valve member 23 is in engagement with a spherical surface 24 of an armature 18. This armature 18 is guided within a core 19. A spring 20 is supported by the core 19 and acts onto the armature 18 so as to press the armature 18 against the valve member 23, and the valve member 23 against the valve seat 22.

In FIG. 2, the valve system 2a is closed by the action of the spring 20. The valve member 23 is in sealing engagement with the valve seat 22 and the spherically shaped annular face 24.

When the respective electromagnetic coil 17 is energized, the armature 18 is moved upwards against the action of the spring 20. Then the valve system 2a is opened by the spherically shaped annular face 24 lifting from the edge 25 of the valve member 23. The damping liquid can flow from the channel 14 across the valve system 2a to the channel 15.

It can be seen from FIG. 2 that the liquid flowing from channel 14 to channel 15 passes a group of bores 21a and a damping resistance 21b provided by a group of resilient discs 21c which are in resilient contact with an annular edge 21d. The liquid flowing from channel 14 to channel 15 lifts the resilient discs 21c from the edge 21d. The biasing force biasing the resilient dics 21c against the edge 21d determines the flow resistance of, the flow path across the valve system 2a.

FIG. 2 shows a central bore 26 extending through the armature 18 so that the upper face 27 of the armature 18 is subjected to the pressure within the channel 14. Thus the forces resulting from the pressure in channel 14 and acting on the armature 18 are substantially balanced.

The valve system 2b of FIG. 1 is identical with the valve system 2a as shown in FIG. 2 and described above. The only difference possibly resides in the biasing force of the resilient discs 21 acting on the edge 21d so that the flow resistances of the valve systems 2a, 2b are different.

Figure 3:
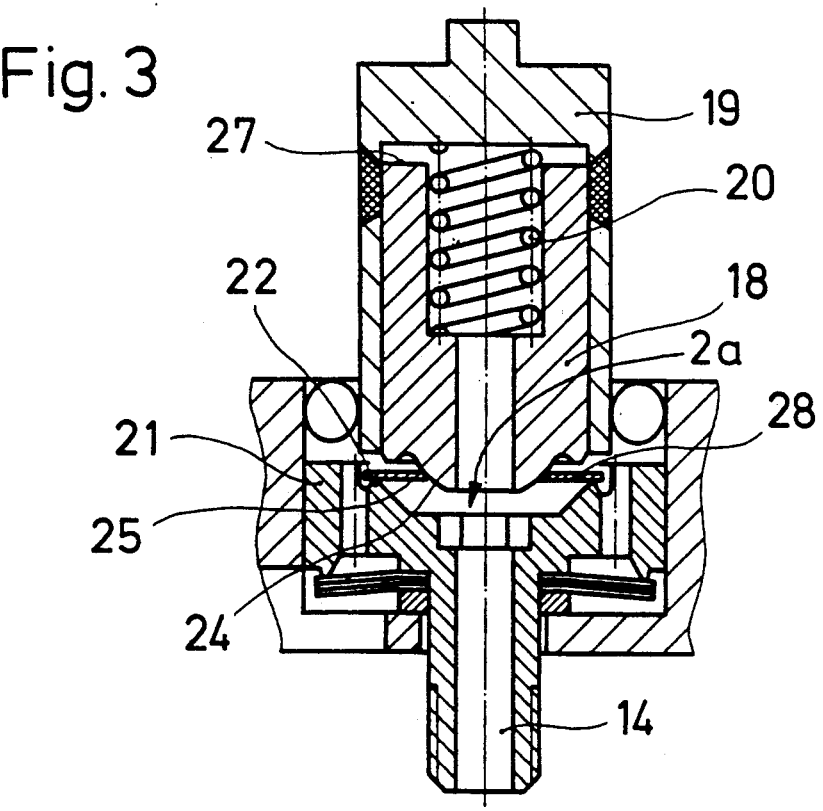
FIG. 3 shows a modified embodiment of the valve system.

FIG. 3 shows an alternative embodiment of the valve system 2. Analogous components are designated by the same reference numerals as in FIG. 2. Only the shape of the valve member 28 has been modified as compared with the valve member 23 in FIG. 2. The valve member 28 is a thin-walled elastic valve member which resiliently absorbs the closure movement of the armature 18 so that closure noises are eliminated. The valve member 28 is resiliently deformable to a screen-shape so that it bears accurately on the inner diameter edge of the valve seat 22 to the effect that the surface subjected to pressure in channel 14 is accurately defined.

It can be seen from both FIG. 2 and FIG. 3 that valve member 23 and valve member 28, respectively, can tilt with respect to the spherical face 24. Moreover a radial displacement of the valve members 23 and 28, respectively, is possible relative to the seat member 21. Thus absolute tightness is warranted even if the axis of the armature 18 is not precisely aligned with the axis of the valve seat 22.

Figure 4:
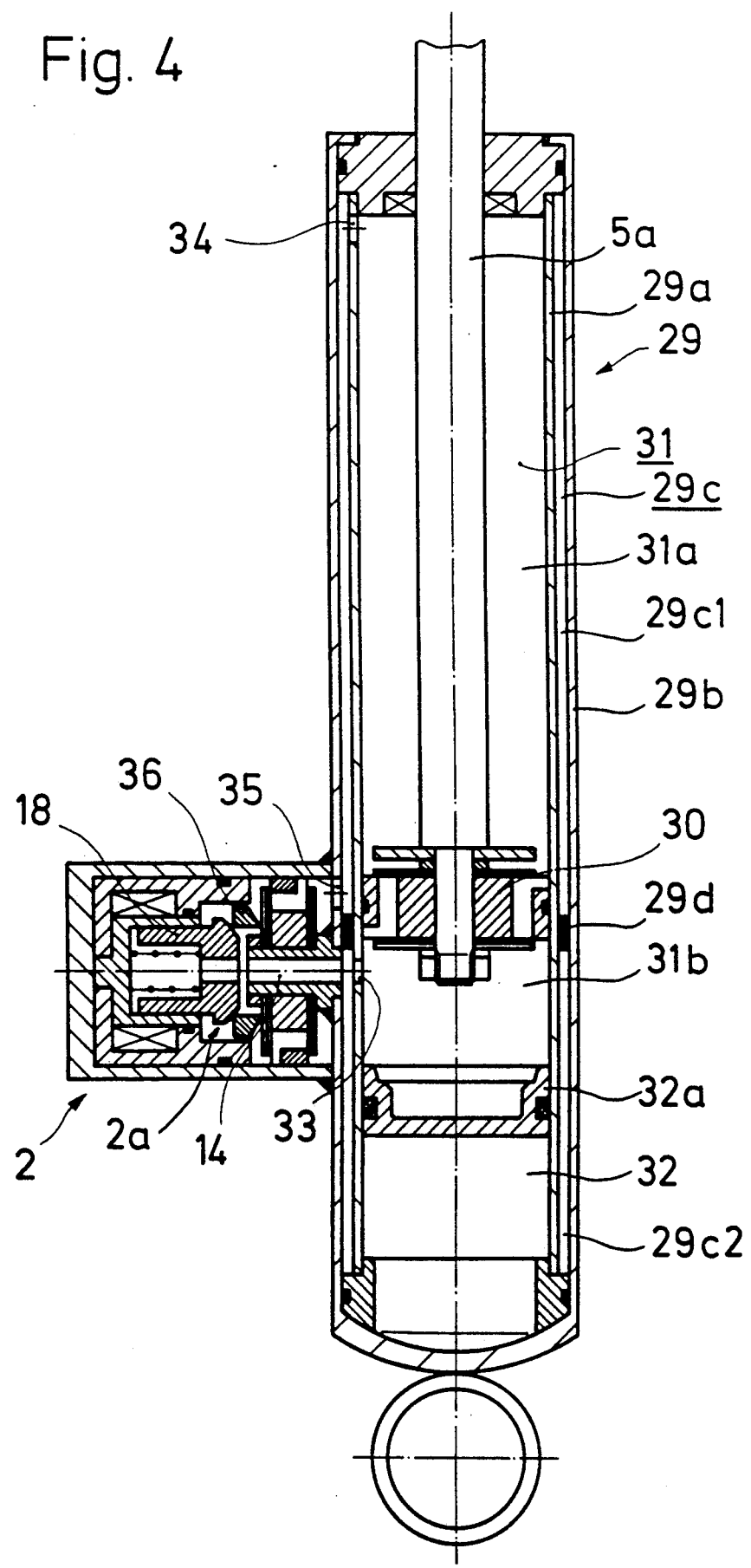
FIG. 4 shows a longitudinal section through a monotube vibration damper with an electromagnetically operated bypass unit.

FIG. 4 shows a mono-tube vibration damper 29 comprising a cylinder tube 29a, a piston rod 5a, and a piston 30. The cavity 31 within the cylinder tube 29a is subdivided by the piston 30 into an upper working chamber 31a and a lower working chamber 31b. The lower working chamber 31b is adjacent a compensating chamber 32 which contains pressurized gas and is separated from the lower working chamber 31b by a floating separating piston 32a. This is the conventional type of a mono-tube vibration damper. Inward and outward movement of the piston rod 5a is damped by damping liquid flowing through piston 30. The damping resistance for both directions of movement may be different.

The cylinder tube 29a is surrounded by an outer tube 29b. An annular space 29c exists between the cylinder tube 29a and the outer tube 29b. This annular space 29c is subdivided by a separating ring 29d into an upper space section 29c1 and a lower space section 29c2. The upper space section 29c1 communicates through a bore 34 with the upper working chamber 31a whereas the lower space section 29c2 communicates with the lower working chamber 31b through a bore 33. A bypass unit 2 is fastened to the outer tube 29b. This bypass unit 2 includes a valve system 2a. One side of this valve system is connected to the upper space section 29c1 through a bore 35 while the other side of the valve system 2a is connected to the lower space section 29c2 through a channel 14. The valve system 2a is electromagnetically operated by an armature 18 acting on a valve member 36.

The basic construction of the armature 18 and the valve member 36 correspond to the construction shown in FIG. 2. More particularly, there is provided again a spherically shaped annular face 24 on the armature 18 cooperating with the annular valve member 36.

Figure 5:
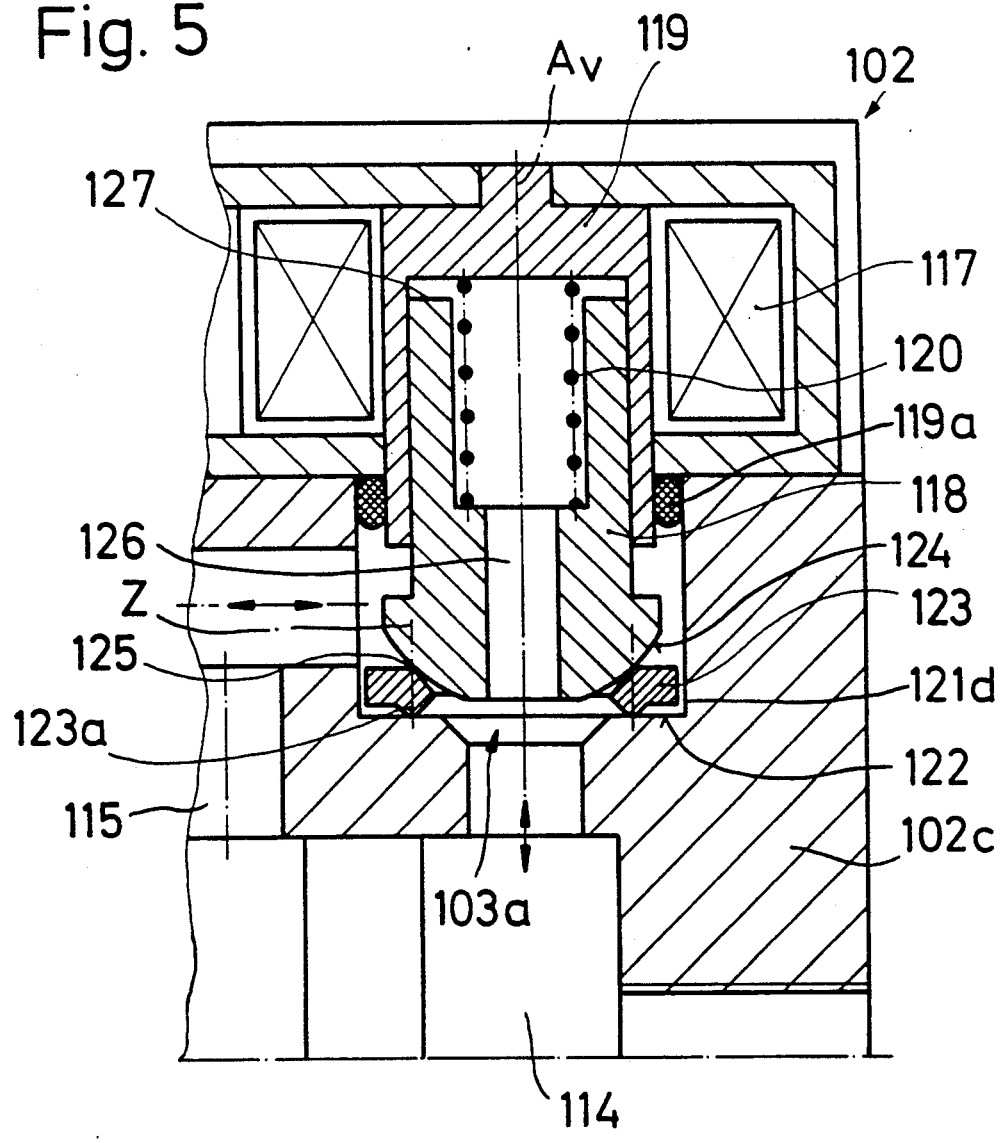
FIG. 5 shows a valve system to be used in the embodiment of FIG. 4.

A preferred embodiment of a bypass unit for a mono-tube vibration damper is illustrated in FIG. 5.

In FIG. 5, analogous parts are designated by the same reference numerals as in FIG. 2 increased by 100.

FIG. 5 again shows the housing 102c of the bypass unit 102 in which housing are provided a channel 114 and a channel 115. Moreover the housing accommodates a magnetic core 119 surrounded by the electromagnetic coil 117. In the electromagnetic core 119 is guided the armature 118 having the spherical face 124. The spherical face 124 is engageable with the annular, valve member 123, the edge 125 of which engages the spherically shaped annular face 124. The annular valve member 123 is provided with a sealing edge 123a which engages a planar sealing face 122 of the housing 102c. A helical compression spring 120 acts onto the armature 118 and is supported by the core 119. The helical compression spring is pretensioned when the valve 103a is closed. The annular valve member 123 is a rigid valve member which may be fabricated by stamping, coining, swaging or sintering. Again the annular valve member 123 has radial play with respect to the bore 121d of the housing 102c.

Again there is a channel 126 which allows the damping liquid from channel 114 to act on the end face 127 of the armature 118.

It is to be noted that the edge 125 and the sealing edge 123a both are located on a virtual cylinder Z which is coaxial with the axis A of the armature 18 to the effect that the armature 118 and the annular valve member 123 are substantially fully balanced with respect to the damping liquid pressures in both the channels 114 and 115. That is of considerable importance because in a mono-tube vibration damper, as shown in FIGS. 4 and 5, it is necessary that no pressure-dependent forces act on the armature 118.

A sealing ring 119a is provided between the core 119 and the housing 102c.

Figure 6:
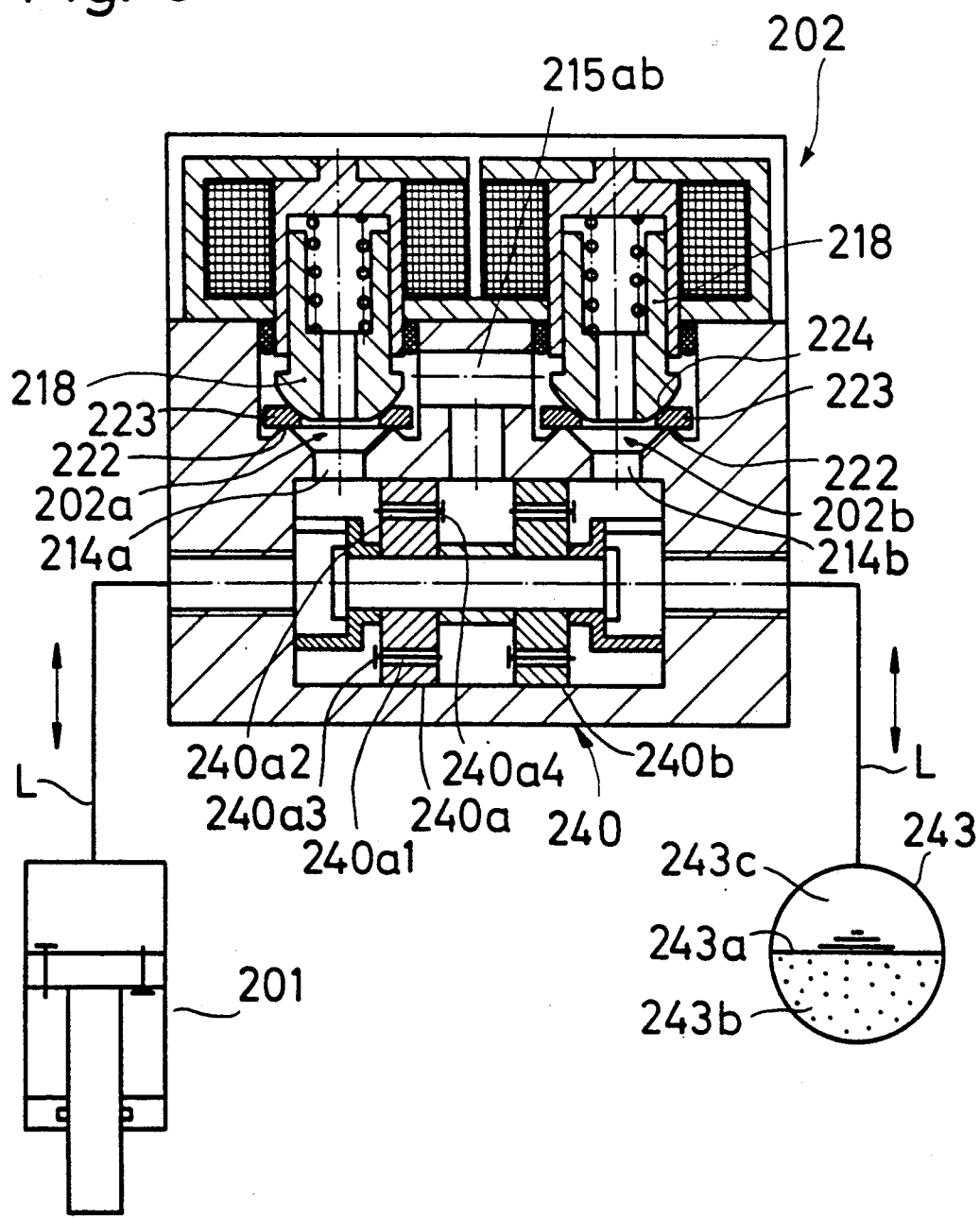
FIG. 6 shows a fluid passage unit of this invention in connection with a hydro-pneumatic suspension system.

FIG. 6 shows a bypass unit 202 with valve systems 202a and 202b. A vibration damper or suspension element 201 is connected through a line L to a spring container 243. The spring container 243 is subdivided by a membrane 243a into a chamber 243b containing pressurized gas and a chamber 243c containing pressurized damping liquid. The line L includes a damping unit 240 having a first damping disc 240a and a second damping disc 240b. The design of both damping discs is identical so that the description of the damping disc 240a will be sufficient for an explanation. The damping disc 240a accommodates a first damping bore 240a1 and a second damping bore 240a2. Both damping bores 240a1 and 240a2 are provided with check valve members 240a3 and 240a4, respectively, so that the flow resistance across the damping disc 240a may be different in response to the flow direction. It can be seen from FIG. 6 that the damping discs 240a and 240b with the respective damping bores are arranged in series between the vibration damper 201 and the spring container 243. When both valve systems 202a, 202b are closed, the damping force is solely defined by the damping bores of the damping discs 240a and 240b. The valve system 202a corresponds to the valve system 2a of FIG. 2. The valve system 202a is provided in a bypass channel system 214a, 215ab which is a bypass for the damping disc 240a. The valve system 202b is located within a channel system 215ab, 214b which is a bypass for the damping disc 240b.

Four conditions are possible:

a) Both valve systems 202a and 202b are closed—none of the bypasses is open.

b) The valve system 202a is open—the damping disc 240a is bypassed.

c) The valve system 202b is open—the damping disc 240b is bypassed.

d) Both valve systems 202a and 202b are open—both damping discs 240a, 240b are bypassed.

Thus four different damping characteristics are possible in this embodiment.

As is the case according to FIG. 2, the forces resulting from the pressure in line L and acting on the armature 218 are balanced.

Specific forms of embodiments of the invention have been represented and described in order to illustrate the use of the principles of the invention. Of course, the invention can be realized also in other ways without departing from these principles.

The reference numbers in the claims only serve to facilitate the understanding and are not to be understood as a limitation.

In FIG. 6, the sealing faces between the valve member 223 and the valve seat 222 on the one hand and between the sealing member 223 and the spherically shaped annular face 224 on the other hand are identical so that again a full compensation of the pressure forces acting on the armature 218 and the valve member 223 is obtained. The valve member 223 again may be fabricated by stamping, coining, swaging or sintering.

What is claimed is:

1. A fluid passage unit comprising means (2c) defining a fluid channel system (14, 21a, 15) and an electromagnetically operated valve system (2a) allocated to said fluid channel system (14, 21a, 15) for controlling fluid flow through said fluid channel system (14, 21a, 15) in at least one flow direction, said valve system (2a) comprising an annular valve unit (23) having an axis, a passage therethrough, and two axially spaced, substantially oppositely directed annular sealing areas (23a, 25) substantially coaxial with said axis, a first one (23a) of said annular sealing areas (23a, 25) being sealingly engageable with an annular first counter-sealing area (22) of a valve seat member (21) surrounding a fluid channel (14), a second one (25) of said annular sealing areas (23a, 25) being sealingly engageable with a second counter-sealing area (24) of a counter-sealing member (18) movably guided substantially along said axis with respect to said valve seat member (21), movement of said counter-sealing member (18) substantially along said axis being controllable by electromagnetic control means (17), said annular valve unit (23) having a radial play with respect to said valve seat member (210 such that said first annular sealing area (23a) of said annular valve unit (23) and said annular first counter-sealing area (22) of said valve seat member (21) have freedom of a substantially radial relative displacement while maintaining sealing engagement thereof and while maintaining a substantially constant orientation of said annular valve unit (23) with respect to said valve seat member (21), at least one (24) of said second sealing area (25) and said second counter-sealing area (24) being a spherically shaped face (24) having a center close to said axis and defining with the other (25) of said second sealing area (25) and said second counter-sealing area (24) a ball-type spherical seal, such that said second sealing area (25) and said second counter-sealing area (24) maintain sealing engagement with one another even when said countersealing member (18) and said annular valve unit (23) are axially tilted relative to each other, said annular valve unit (23) being in sealing engagement by said first and second annular sealing areas (23a, 25) with both said annular first counter-sealing area (22) and said second counter-sealing area (24) when said counter-sealing member (18) is in a terminal position close to said valve seat member (21).

2. A fluid passage unit as set forth in claim 1, said fluid passage unit being in operative connection with a vibration damping unit (1), said vibration damping unit (1) comprising a cylinder member (4, 11) and a piston rod member (5a), at least two fluid chambers (6a, 6b, 12) being defined within at least one of said cylinder (4, 11) and said piston rod member (5a), and said at least two fluid chambers (6a, 6b, 12) being connected to said fluid passage unit (2).

3. A fluid passage unit as set forth in claim 2, said fluid passage unit (2) comprising a housing (2c) rigidly fixed to said vibration damping unit (1).

4. A fluid passage unit as set forth in claim 2, said fluid passage unit (202) being connected to said at least two fluid chambers by external conduit means (L).

5. A fluid passage unit as set forth in claim 2, said vibration damping unit (1) being a double-tube vibration damper.

6. A fluid passage unit as set forth in claim 2, said vibration damping unit being a mono-tube vibration damper.

7. A fluid passage unit as set forth in claim 2, said vibration damping unit (201) being included in a hydropneumatic suspension system.

8. A fluid passage unit as set forth in claim 1, said annular valve unit (23) consisting of a single part.

9. A fluid passage unit as set forth in claim 1, one of said first annular sealing area (23a) and said annular first counter-sealing area (22) being a substantially planar face substantially perpendicular to said axis, the other one of said first annular sealing area (23a) and said annular first counter-sealing area (22) being a substantially circular edge.

10. A fluid passage unit as set forth in claim 9, said annular first counter-sealing area (22) being a substantially circular edge.

11. A fluid passage unit as set forth in claim 1, the other one (25) of said second annular sealing area (25) and said second counter-sealing area (24) being a substantially circular edge.

12. A fluid passage unit as set forth in claim 11, said spherically shaped face (24) being disposed on said counter-sealing member (18).

13. A fluid passage unit as set forth in claim 1, said counter-sealing member (18) being an armature of a solenoid.

14. A fluid passage unit as set forth in claim 13, said armature (18) being guided within a hollow core member (19) of said solenoid, said hollow core member (19) being surrounded by an electromagnetic coil (17).

15. A fluid passage unit as set forth in claim 1, at least one of said first annular sealing area (23a) and said annular first counter-sealing area (22) being provided by a substantially planar face substantially perpendicular to said axis.

16. A fluid passage unit as set forth in claim 1, both said second annular sealing area and said second counter-sealing area (224) being spherically shaped faces.

17. A fluid passage unit as set forth in claim 1, said annular valve unit (23) being a rigid valve member.

18. A fluid passage unit as set forth in claim 1, said annular valve unit (23) being a thin-walled resilient valve member.

19. A fluid passage unit as set forth in claim 1, said counter-sealing member (18) being against the bias action of spring means (20).

20. A fluid passage unit as set forth in claim 1, said counter-sealing member (18) being biased towards a fluid-flow interrupting position by spring means (20) and being movable by an electromagnetic coil (17) towards a fluid-flow permitting position.

21. A fluid passage unit as set forth in claim 1, said counter-sealing member (18) being such that, under fluid pressure within said fluid channel system (14, 21a, 15), the forces resulting from the fluid pressure are substantially balanced.

22. A fluid passage unit as set forth in claim 1, said counter-sealing member (18) having a substantially axially directed bore (26) and two axially spaced end faces, said end faces being interconnected by said bore (26), and said bore (26) being adapted for equalization of fluid pressure acting on said two end faces.

* * * * *

UNITED STATES PATENT AND TRADEMARK OFFICE
CERTIFICATE OF CORRECTION

PATENT NO. : 5,180,039
DATED : January 19, 1993
INVENTOR(S) : Axthammer et al.

It is certified that error appears in the above-identified patent and that said Letters Patent is hereby corrected as shown below:

Col. 1, line 53, "is in" should read --is in universal link--;

Col. 2, line 11, "spherical support face" should read --spherically shaped annular face--;

Col. 7, line 68, "(210" should read --(21)--;

Col. 10, line 5, "being" should read --being movable by an electromagnetic coil (17)--.

Signed and Sealed this

Twenty-first Day of December, 1993

Attest:

BRUCE LEHMAN

Attesting Officer

Commissioner of Patents and Trademarks